F. M. BRIGGS.
Insect Destroyer.
No. 80,446.
Patented July 28, 1868.
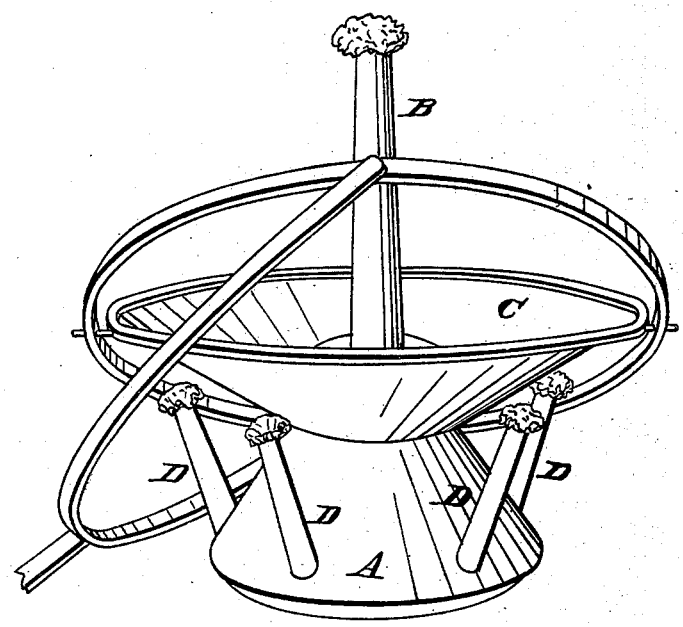
Witnesses:
Inventor:
F. Markham Briggs
per Thos. S. Sprague
Attys

United States Patent Office.

F. MARKHAM BRIGGS, OF LIVONIA, MICHIGAN.

Letters Patent No. 80,446, dated July 28, 1868.

IMPROVED LAMP FOR DESTROYING INSECTS IN TREES.

*The Schedule referred to in these Letters Patent and making part of the same.*

TO WHOM IT MAY CONCERN:

Be it known that I, F. MARKHAM BRIGGS, of Livonia, in the county of Wayne, and State of Michigan, have invented a new and useful Improvement in Lamps for Destroying Insects in Trees; and I do declare that the following is a true and accurate description thereof, reference being had to the accompanying drawings, and to the letters of reference marked thereon, and being a part of this specification.

The object of this invention is to so construct a lamp for the purpose of destroying worms and other insects in trees that will catch the insects as they fall from the tree, and destroy them by a fire under the pan into which they fall.

It consists in a conical or other convenient form of lamp, A, provided with a wick-tube, B, by means of which the insects' or worms' nests are burned. The insects, after their nests are destroyed, fall into a pan, C, which is made of any suitable material, and rigidly attached near the top of the lamp. Near the bottom of the lamp are other and smaller wick-tubes D, by means of which, when lighted, the pan C is kept sufficiently hot to destroy the insects that fall into it.

This lamp may be suspended in any suitable frame, similar to those used on shipboard for the purpose of suspending binnacle-lamps, or it may be simply attached to a pole or rod of suitable length.

What I claim as my invention, and desire to secure by Letters Patent, is—

The construction of a lamp, A, provided with any suitable pan, C, and arranged to be heated by means of wick-tubes, D, substantially operating as and for the purposes herein described.

F. MARKHAM BRIGGS.

Witnesses:
    G. C. HYDE,
    H. F. EBERTS.